United States Patent
Zhang et al.

(10) Patent No.: US 12,112,623 B1
(45) Date of Patent: Oct. 8, 2024

(54) METHOD FOR PREDICTING TRAJECTORY OF TRAFFIC PARTICIPANT IN COMPLEX HETEROGENEOUS ENVIRONMENT

(71) Applicant: TONGJI UNIVERSITY, Shanghai (CN)

(72) Inventors: Lin Zhang, Shanghai (CN); Hong Chen, Shanghai (CN); Rongjie Yu, Shanghai (CN); Qiang Meng, Shanghai (CN); Jinlong Hong, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/537,771

(22) Filed: Dec. 12, 2023

(30) Foreign Application Priority Data

Apr. 4, 2023 (CN) .......................... 202310363218.2

(51) Int. Cl.
*G08G 1/01* (2006.01)
*B60W 60/00* (2020.01)
*G08G 1/015* (2006.01)

(52) U.S. Cl.
CPC ..... *G08G 1/0133* (2013.01); *B60W 60/00276* (2020.02); *G08G 1/015* (2013.01)

(58) Field of Classification Search
CPC ................ G08G 1/0133; G08G 1/015; B60W 60/00276
See application file for complete search history.

(56) References Cited

U.S. PATENT DOCUMENTS

| | | | |
|---|---|---|---|
| 2017/0016734 A1* | 1/2017 | Gupta | B60W 30/00 |
| 2020/0086879 A1* | 3/2020 | Lakshmi Narayanan | G06V 20/597 |
| 2021/0272018 A1* | 9/2021 | Casas | G05D 1/0088 |
| 2021/0385865 A1* | 12/2021 | Mueck | H04W 80/02 |
| 2022/0144303 A1* | 5/2022 | Agarwal | B60W 30/095 |
| 2022/0306160 A1* | 9/2022 | Girase | G01S 17/86 |
| 2022/0343241 A1* | 10/2022 | Jha | G08G 1/166 |
| 2023/0110467 A1* | 4/2023 | Jha | G08G 1/096791 701/24 |

* cited by examiner

*Primary Examiner* — Peter D Nolan
*Assistant Examiner* — Wae L Louie
(74) *Attorney, Agent, or Firm* — Bochner PLLC; Andrew D. Bochner

(57) ABSTRACT

Disclosed is a method for predicting a trajectory of a traffic participant in a complex heterogeneous environment, including the following steps: obtaining traffic participant information in a complex heterogeneous environment; arranging and numbering traffic participant classes based on the class information, to obtain serial numbers of the traffic participant classes; establishing a position graph, a velocity graph, an acceleration graph, and a class graph, into each of which expert experience is introduced; and capturing topological structure relationships and time dependence relationships to obtain a position hidden state, a velocity hidden state, an acceleration hidden state, and a class hidden state; classifying the position hidden state, the velocity hidden state, the acceleration hidden state, and the class hidden state to obtain a hidden state set of traffic participants; and decoding hidden states of the traffic participants separately using a corresponding decoder to obtain future trajectory predictions of the traffic participants.

10 Claims, 3 Drawing Sheets

METHOD FOR PREDICTING TRAJECTORY OF TRAFFIC PARTICIPANT IN COMPLEX HETEROGENEOUS ENVIRONMENT

CROSS REFERENCE TO RELATED APPLICATION

This patent application claims the benefit and priority of Chinese Patent Application No. 202310363218.2, filed with the China National Intellectual Property Administration on Apr. 4, 2023, the disclosure of which is incorporated by reference herein in its entirety as part of the present application.

TECHNICAL FIELD

The present disclosure relates to the field of trajectory prediction, and in particular, to a method for predicting a trajectory of a traffic participant in a complex heterogeneous environment.

BACKGROUND

With the development of intelligent vehicles and the people's yearning for a convenient and safe travel mode, developing intelligent vehicles is a main development direction of means of transportation at present. Thus, it is inevitable that an intelligent vehicle travels in a complex heterogeneous environment composed of pedestrians, bicycles, and vehicles. Accurate prediction of a traffic participant's trajectory is a guarantee that ensures safe and reliable trajectory planning for an intelligent vehicle. Therefore, there is an urgent need to study a trajectory prediction method applied to a complex heterogeneous environment.

Existing methods based on Long Short-Term Memory neural networks or graph convolutional neural networks and their improvements focus on studying the influence of social interaction on a future trajectory. Moreover, by introducing an empirical approach of obstacle avoidance based on Field of View (FOV) to consider the nonlinearity and asymmetry of interaction between traffic participants of a sample class, good effects have been achieved in pedestrian datasets or vehicle datasets. However, such methods exhibit poor performance in the complex heterogeneous environment composed of pedestrians, bicycles, and manned vehicles. The reason is that such methods neglect differences between participants of different classes. For example, firstly, in a same traffic environment, because of being bound by different social constraints, different traffic participants may pay attention to different traffic information. Secondly, due to different dynamic characteristics between different traffic participants, different traffic participants are different in motion capability and inconsistent in motion state dependence between upper and lower points of time. Finally, weights for different traffic participants to process their own state information and traffic information are inconsistent. For example, pedestrians may care more about the traffic information because the pedestrians can stop immediately while bicycles and vehicles cannot.

However, there is no trajectory prediction method that can individually take into account the dynamic characteristics of different traffic participants, different social attributes of different traffic participants, and a difference in processing environmental information between different traffic participants in the prior art, and prediction accuracy of an intelligent robot in a complex heterogeneous environment cannot be further improved.

SUMMARY

An objective of the present disclosure is to provide a method for predicting a trajectory of a traffic participant in a complex heterogeneous environment that takes into account the dynamic characteristics of different traffic participants, different social attributes of different traffic participants, and a difference in processing environmental information between different traffic participants in the prior art, thereby improving trajectory prediction accuracy in the complex heterogeneous environment.

The objective of the present disclosure can be achieved by the following technical solution.

A method for predicting a trajectory of a traffic participant in a complex heterogeneous environment includes the following steps:
  obtaining traffic participant information in a complex heterogeneous environment, where the traffic participant information includes position information, velocity information, acceleration information, and class information;
  arranging and numbering traffic participant classes based on the class information, to obtain serial numbers of the traffic participant classes;
  establishing, based on the traffic participant information, a position graph, a velocity graph, an acceleration graph, and a class graph, into each of which expert experience is introduced;
  capturing topological structure relationships and time dependence relationships from the position graph, the velocity graph, the acceleration graph, and the class graph based on four parallel spatial relationship capture networks and time dependence relationship capture networks, to obtain a position hidden state, a velocity hidden state, an acceleration hidden state, and a class hidden state;
  classifying the position hidden state, the velocity hidden state, the acceleration hidden state, and the class hidden state through determination by equations based on the serial numbers to obtain a hidden state set of traffic participants; and
  decoding hidden states of the traffic participants separately using a multi-mode decoder based on traffic participant classes to obtain future trajectory predictions of the traffic participants.

The traffic participant classes may include pedestrian, bicycle, and vehicle.

The arranging and numbering traffic participant classes based on the class information, to obtain serial numbers of the traffic participant classes may specifically include: arranging the class information as a class sequence in order, denoted by $[C^1, C^2 \ldots C^i \ldots C^N]$, where $C^i$ represents a class of the ith traffic participant; $C^i=1$ represents that the ith traffic participant is a pedestrian; $C^i=2$ represents that the ith traffic participant is a bicycle; $C^i=3$ represents that the ith traffic participant is a vehicle; N represents a number of traffic participants; and serial numbers corresponding to the class sequence are $[1, 2, \ldots i \ldots N]$.

The class graph into which the expert experience is introduced may use a traffic participant risk coefficient as a node and a risk degree as an edge, and an expert experience correction coefficient related to a transportation agent class may be introduced into the edge, where the traffic participant risk coefficient depends on the traffic participant classes; and a relative distance between the risk degree and a traffic participant is related to an included angle of a velocity vector.

The expert experience correction coefficient related to the transportation agent class may be:

$$OAE_C^{ij} = \begin{cases} 1 + \left| \frac{\vec{v}_i \cdot \vec{D}_{ji}}{\|\vec{v}_i\| \cdot \|\vec{D}_{ji}\|} \right|, & \left| acos\left( \frac{\vec{v}_i \cdot \vec{D}_{ji}}{\|\vec{v}_i\| \cdot \|\vec{D}_{ji}\|} \right) \right| \leq \frac{\pi}{2} \\ 0, & others \end{cases}$$

where $OAE_C^{ij}$ represents the expert experience correction coefficient related to the transportation agent class; vi represents a velocity vector of a traffic participant i; and $\vec{D}_{ji}$ represents a relative position vector between the traffic participant i and a traffic participant j.

The class graph may be established by:

$$G_C = (U_C, E_C)$$

$$U_C = \{u_C^i = (C_c^i) | i = 1, 2, \ldots, N; c \in [1, 2, 3]\}$$

$$E_C = \left\{ e_C^{ij} = OAE_C^{ij} \times \frac{1}{\|\vec{D}_{ji}\| + 1} | i, j = 1, 2, \ldots, N \right\}$$

where $G_C$ represents the class graph; $U_C$ is a node of the class graph, representing the traffic participant risk coefficient; c∈[1,2,3] corresponds to a pedestrian, a bicycle, or a vehicle, respectively; $E_C$ is an edge of the class graph, representing the risk degree; and $\vec{v}_j$ represents the velocity vector of the traffic participant j.

The classifying the position hidden state, the velocity hidden state, the acceleration hidden state, and the class hidden state through determination by equations based on the serial numbers may specifically include: performing matching on arranged features based on the serial numbers according to a position hidden state arrangement, a velocity hidden state arrangement, an acceleration hidden state arrangement, and a class hidden state arrangement output by the spatial relationship capture networks and the time dependence relationship capture networks, classifying features having a same serial number into a same class when the serial numbers in different arrangements are the same, namely when determination by equations is met, and obtaining a pedestrian hidden state set, a bicycle hidden state set, and a vehicle hidden state set based on serial number classes.

The spatial relationship capture network may be a graph convolutional neural network.

The time dependence relationship capture network may be a temporal convolutional network, a Long Short-Term Memory neural network, a recurrent neural network, or a gated neural network.

The multi-mode decoder may be established by using a Long Short-Term Memory neural network, a convolutional neural network, a temporal convolutional network, a recurrent neural network, or a gated neural network.

Compared with the prior art, the present disclosure has the following beneficial effects:
(1) The present disclosure uses a multi-layer directed graph convolutional neutral network to encode nonlinear relationships of positions, velocities, accelerations, and neighborhood classes of traffic participants to social interactions. The social interactions in a complex heterogeneous environment composed of a plurality of classes of traffic participants can be described more subtly, and especially the established class graph, which is a key for expressing social attributes of different neighbors, i.e., a risk degree, may provide necessary information for accurately predicting a future trajectory of a participant to avoid different classes of traffic participants.
(2) A decoder used in the present disclosure is a multi-mode decoder based on traffic participant classes, which is a key for expressing a characteristic that different traffic participants differently process environmental information. In the case of the same social interaction and environmental information, since the attentions of different traffic participants to a plurality of pieces of environmental information and the attentions to a plurality of social interactions are inconsistent, the multi-mode decoder proposed in the present disclosure may effectively express different processing of information by different traffic participants and improve the trajectory prediction accuracy in a complex heterogeneous environment composed of a plurality of classes of traffic participants.

BRIEF DESCRIPTION OF THE DRAWINGS

In FIG. 1, 1-Encoding part, 2-Decoding part, 3-Offline dataset, 4-Position, velocity, 5-Position, acceleration, 6-Position, acceleration, class, 7-Position graph, 8-Velocity graph, 9-Acceleration graph, 10-Class graph, 11-First layer, Graph convolution and temporal convolution, 12-Second layer, Graph convolution and temporal convolution, 13-Third layer, Graph convolution and temporal convolution, 14-Fourth layer, Graph convolution and temporal convolution, 15-class, 16-Position hidden state, 17-Velocity hidden state, 18-Acceleration hidden state, 19-Class hidden state, 20-Classifier, 21-All hidden states related to pedestrians, 22-All hidden states related to bicycles, 23-All hidden states related to vehicles, 24-Pedestrian decoder, 25-Bicycle decoder, 26-Vehicle decoder, 27-Pedestrian trajectory, 28-Bicycle trajectory, 29-Vehicle trajectory, 30-Splice to obtain future trajectories of all traffic participants around in the environment;

In FIG. 3, 1-Complex heterogeneous traffic environment, 2-Position, 3-Velocity, 4-Acceleration 5-Class, 6-Class, 7-Position graph, 8-Velocity graph, 9-Acceleration graph, 10-Class graph, 11-Participant arrangement and serial No., 12-Position hidden state arrangement, 13-Velocity hidden state arrangement, 14-Acceleration hidden state arrangement, 15-Class hidden state arrangement, 16-Serial No., 17-Class sequence, 18-Pedestrian, 19-Bicycle, 20-Vehicle, 21-Pedestrian hidden state set, 22-Bicycle hidden state set, 23-Vehicle hidden state set, 24-Classification through determination by equations, 25-Number of cycles equal to the length of the class sequence.

DETAILED DESCRIPTION OF THE EMBODIMENTS

The present disclosure will be described in detail below with reference to the drawings and specific embodiments. The embodiments are implemented on the premise of the technical solutions of the present disclosure. The following presents detailed implementations and specific operation processes. The protection scope of the present disclosure, however, is not limited to the following embodiments.

Figure 1:
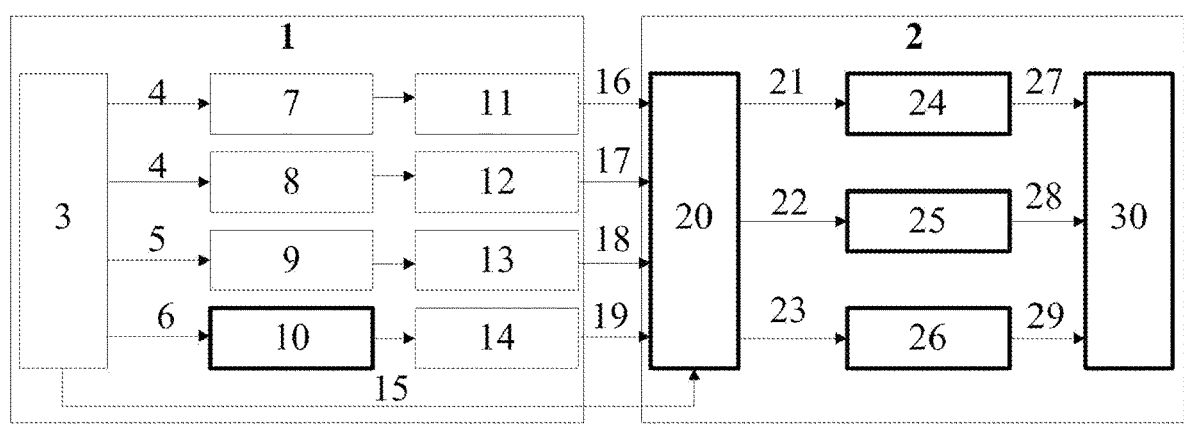
FIG. 1 is a flowchart of a method according to the present disclosure.

In a complex heterogeneous traffic environment, an accurate trajectory is a challenge since a social interaction between traffic participants is time-varying and nonlinear and there is a difference in processing environmental information between a plurality of classes of traffic participants. The present embodiment proposes a trajectory prediction model based on a multi-layer directed graph convolutional neutral network and multi-mode analysis for solving the challenge. As shown in FIG. 1, the model is composed of an encoder and a decoder. The encoder is established based on a multi-layer graph convolutional neutral network. In the present embodiment, a class graph is innovatively introduced to take different social attributes of different traffic participants into account. Regarding the decoding part, a multi-mode decoder is innovatively established based on traffic participant classes in the present embodiment. The multi-mode decoder enables the proposed model to express the characteristic that different traffic participants differently process environmental information.

Figure 2:
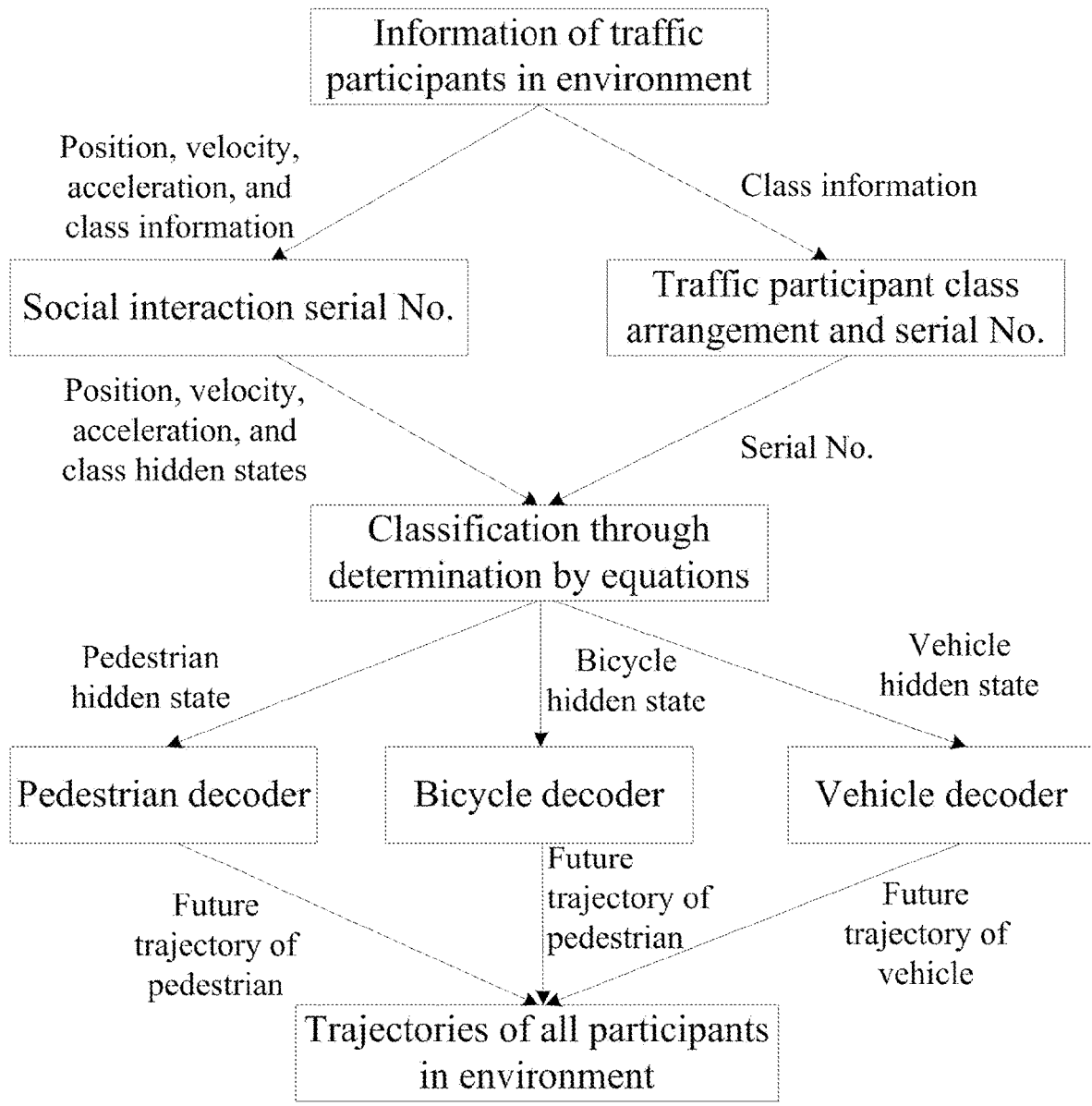
FIG. 2 is a model architecture diagram of a method according to the present disclosure.

Based on the above-mentioned model architecture, the present embodiment specifically provides a method for predicting a trajectory of a traffic participant in a complex heterogeneous environment, as shown in FIG. 2, including the following steps.

1) Traffic participant information in a complex heterogeneous environment is obtained. In the present embodiment, the participant information includes position information, velocity information, acceleration information, and class information, where traffic participant classes are described in detail by taking typical pedestrian, bicycle, and vehicle for example.

2) Traffic participant classes are arranged and numbered based on the class information.

The class information is arranged as a class sequence in order, denoted by $[C^1, C^2, \ldots C^i \ldots C^N]$, where $C^i$ represents a class of the ith traffic participant; $C^i=1$ represents that the ith traffic participant is a pedestrian; $C^i=2$ represents that the ith traffic participant is a bicycle; $C^i=3$ represents that the ith traffic participant is a vehicle; N represents a number of traffic participants; and serial numbers corresponding to the class sequence are $[1, 2, \ldots i \ldots N]$.

By the above-mentioned processing, serial numbers may correspond to the traffic participant classes one to one such that features of different traffic participant classes are classified in subsequent steps.

3) a position graph, a velocity graph, an acceleration graph, and a class graph, into each of which expert experience is introduced, are established based on the traffic participant information.

31) Position graph $G_P$ $$G_P = (U_P, E_P)$$

$$U_P = \{u_P^i = (x_i, y_i) | i = 1, 2, \ldots, N\}$$

$$E_P = \left\{ e_P^{ij} = OAE_P^{ij} \times \frac{1}{\|\vec{D}_{ji}\| + 1} | i, j = 1, 2, \ldots, N \right\}$$

$$OAE_P^{ij} = \begin{cases} 1 + \left| \frac{\vec{v}_i \cdot \vec{D}_{ji}}{\|\vec{v}_i\| \cdot \|\vec{D}_{ji}\|} \right|, & \left| acos\left( \frac{\vec{v}_i \cdot \vec{D}_{ji}}{\|\vec{v}_i\| \cdot \|\vec{D}_{ji}\|} \right) \right| \leq \frac{\pi}{2} \\ 0, & \text{others} \end{cases}$$

In the above formulas, $U_P$ is a node of the position graph, represented by a position of a traffic participant; $E_P$ is an edge of the position graph, representing an interactive relationship under the action of a relative position; $\vec{D}_{ji}$ represents a relative position vector between a traffic participant i and a traffic participant j; $OAE_P^{ij}$ is an introduced expert experience correction coefficient for a relative position relationship; and $\vec{v}_i$ is a velocity vector of the traffic participant i, representing a direction of a center line of a field angle of the traffic participant.

Obstacles beyond the angle of view of an agent may not affect the future trajectories of the traffic participants. On this basis, it is assumed that a viewing angle range of a traffic participant is within 180°, and from the avoidance experience of traffic participants, the closer the relative position between the traffic participants, the more obvious the interactive adversarial relationship between the traffic participants. Therefore, a velocity of the traffic participant is taken as the center line of the field angle, and when an included angle between the velocity of the traffic participant and the relative position of traffic participants is less than or equal to ±90°, the prediction on the trajectory of the traffic participant will be affected to an extent which depends on the magnitudes of the velocity of the traffic participant and the relative position. Thus, the expert experience correction coefficient for the relative position relationship is determined.

32) Velocity graph $G_V$ $$G_V = (U_V, E_V)$$

$$U_V = \{u_V^i = (v_x^i, v_y^i) | i = 1, 2, \ldots, N\}$$

$$E_V = \left\{ e_V^{ij} = OAE_V^{ij} \times \frac{1}{\|\vec{D}_{ji}\| + 1} | i, j = 1, 2, \ldots, N \right\}$$

$$OAE_V^{ij} = \left[ 2 - \left| \left( \frac{\vec{v}_i \cdot \vec{v}_j}{|\vec{v}_i| \cdot |\vec{v}_j|} \right) \right| \right] \times (\|\vec{v}_i - \vec{v}_j\|)$$

In the above formulas, $U_V$ is a node of the velocity graph, represented by a velocity of a traffic participant; $E_V$ is an edge of the velocity graph, representing an interactive relationship under the action of a relative position; and $OAE_V^{ij}$ is an introduced expert experience correction coefficient for a relative velocity relationship.

Within the angle of view, the interactive relationship between traffic participants is related to a relative velocity and a relative acceleration therebetween, in additional to a relative position. For example, although two traffic participants are close to each other, a conflict between them is not intense since the directions of the relative velocity and the relative acceleration are parallel. Conversely, if two traffic participants are far away from each other, the interaction between them exhibits an intense conflict since the directions of the relative velocity and the relative acceleration are perpendicular. It can thus be seen that the influence of interaction between traffic participants gradually increases as the relative velocity and the relative acceleration of them increase and the included angle between them increase to a right angle. Thus, the expert experience correction coefficient for the relative velocity relationship described above and the expert experience correction coefficient for the relative acceleration relationship described below can be determined.

33) Acceleration graph $G_A$ $$G_A = (U_A, E_A)$$

$$U_A = \{u_A^i = (a_x^i, a_y^i) | i = 1, 2, \ldots, N\}$$

$$E_A = \left\{ e_A^{ij} = OAE_A^{ij} \times \frac{1}{\|\vec{D}_{ji}\| + 1} | i, j = 1, 2, \ldots, N \right\}$$

$$OAE_A^{ij} = \left[ 2 - \left| \left( \frac{\vec{a}_i \cdot \vec{a}_j}{|\vec{a}_i| \cdot |\vec{a}_j|} \right) \right| \right] \times (\|\vec{a}_i - \vec{a}_j\|)$$

In the above formulas, $U_A$ is a node of the acceleration graph, represented by an acceleration of a traffic participant; $E_A$ is an edge of the acceleration graph, representing an interactive relationship under the action of a relative acceleration; $OAE_A^{ij}$ is an introduced expert experience correction coefficient for a relative acceleration relationship; di is an acceleration vector of the traffic participant i; and $\vec{a}_j$ is an acceleration vector of the traffic participant j.

34) Class graph

In the complex heterogeneous environment, a road is shared by pedestrians, bicycles, and vehicles together. Due to inconsistent sizes, motion capabilities, and constituent materials of traffic participants, different agents may have different rick coefficients. This is the root cause for different social attributes of different traffic participants.

In the present disclosure, the class graph into which the expert experience is introduced may use a traffic participant risk coefficient as a node and a risk degree as an edge, and an expert experience correction coefficient related to a transportation agent class may be introduced into the edge. The traffic participant risk coefficient depends on the traffic participant classes, and the nodes of the pedestrian, the bicycle, and the vehicle are defined as 1, 2, and 3. In the case of a same traffic participant ahead, the smaller the relative distance, the higher the risk degree. Similarly, the risk degree when the included angle of the velocity vector is a right angle is higher than that when the included angle of the velocity vector is a parallel angle. Therefore, the risk degree is related to the relative distance between traffic participants and the included angle of the velocity vector.

Thus, the established class graph $G_C$ is:

$$G_C = (U_C, E_C)$$

$$U_C = \{u_c^i = (C_c^i) | i = 1, 2, \ldots, N; c \in [1, 2, 3]\}$$

$$E_C = \left\{ e_c^{ij} = OAE_C^{ij} \times \frac{1}{\|\vec{D}_{ji}\| + 1} | i, j = 1, 2, \ldots, N \right\}$$

$$OAE_C^{ij} = \begin{cases} 1 + \left| \frac{\vec{v}_i \cdot \vec{D}_{ji}}{\|\vec{v}_i\| \cdot \|\vec{D}_{ji}\|} \right|, & \left| \operatorname{acos}\left( \frac{\vec{v}_i \cdot \vec{D}_{ji}}{\|\vec{v}_i\| \cdot \|\vec{D}_{ji}\|} \right) \right| \leq \frac{\pi}{2} \\ 0, & \text{others} \end{cases}$$

In the above formulas, $G_C$ represents the class graph; $U_C$ is a node of the class graph, representing a traffic participant risk coefficient; $c \in [1, 2, 3]$ corresponds to a pedestrian, a bicycle, or a vehicle, respectively; $E_C$ is an edge of the class graph, representing a risk degree; $OAE_C^{ij}$ represents an expert experience correction coefficient related to a transportation agent class; $v_i$ represents the velocity vector of the traffic participant i; $\vec{v}_j$ represents the velocity vector of the traffic participant j; and $\vec{D}_{ji}$ represents the relative position vector between the traffic participant i and the traffic participant j.

4) Topological structure relationships and time dependence relationships are captured from the position graph, the velocity graph, the acceleration graph, and the class graph based on four parallel spatial relationship capture networks and time dependence relationship capture networks, to obtain a position hidden state, a velocity hidden state, an acceleration hidden state, and a class hidden state.

By the above process, the position graph, the velocity graph, the acceleration graph, and the class graph are established, but the topological structure relationships and the time dependence relationships of the nodes in the graphs are not obtained. In the present embodiment, four graph convolutional neutral networks and temporal convolutional networks for parallel computing are used to capture the topological structure relationships and the time dependence relationships of the nodes in the four graphs. In the consideration of the excellent topological structure learning capability of the graph convolutional neutral network, other networks are not recommended. For the capture of the time dependence relationships, other sequential neural networks may be used, such as a Long Short-Term Memory neural network, a recurrent neural network, or a gated neural network.

Figure 3:
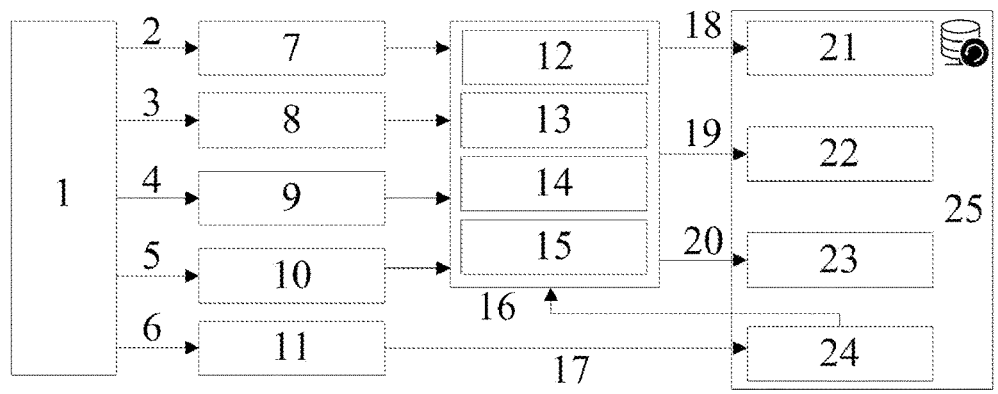
FIG. 3 is a schematic diagram of a working principle of a classifier according to the present disclosure.

5) The position hidden state, the velocity hidden state, the acceleration hidden state, and the class hidden state are classified through determination by equations based on the serial numbers to obtain a hidden state set of traffic participants; and Specifically, as shown in FIG. 3, matching is performed on arranged features based on the serial numbers according to a position hidden state arrangement, a velocity hidden state arrangement, an acceleration hidden state arrangement, and a class hidden state arrangement output by the spatial relationship capture networks and the time dependence relationship capture networks; features having a same serial number are classified into a same class when the serial numbers in different arrangements are the same, namely when determination by equations is met, and a pedestrian hidden state set, a bicycle hidden state set, and a vehicle hidden state set are obtained based on serial number classes.

6) Hidden states of the traffic participants are decoded separately using a multi-mode decoder based on traffic participant classes to obtain future trajectory predictions of the traffic participants.

The decoder used in the present disclosure is a multi-mode decoder based on traffic participant classes, which is a key for expressing a characteristic that different traffic participants differently process environmental information. Specifically, three Long Short-Term Memory neural networks for parallel computing are used to decode hidden states of a pedestrian, a bicycle, and a vehicle, respectively. These hidden states are calculated and classified by the encoding part. The three Long Short-Term Memory neural networks for parallel computing output future trajectories of the pedestrian, the bicycle, and the vehicle, respectively, and finally, states are spliced and plotted in one graph to obtain future trajectories of traffic participants around an agent. The decoder may also use other intelligent algorithms, such as a convolutional neural network, a temporal convolutional network, a recurrent neural network, or a gated neural network. That is, the present embodiment does not limit the specific model used by the decoder and focuses on establishing a corresponding multi-mode decoder for hidden states of the traffic participants to identify different processing capabilities of different traffic participants for environmental information.

Figure 4:
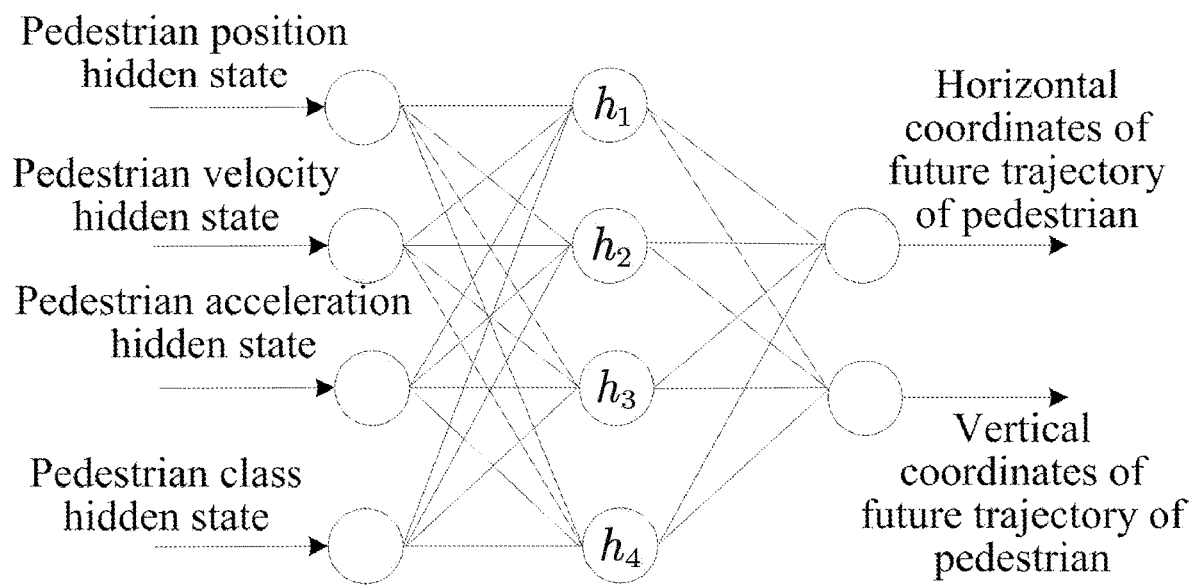
FIG. 4 is an architecture diagram of a pedestrian decoder in one embodiment of the present disclosure.

In the present embodiment, an establishment principle of a pedestrian decoder is specifically described by taking the simplest convolutional neural network for example. A bicycle decoder is the same as a vehicle decoder in architecture except that input features are different. As shown in FIG. 4, inputs to the pedestrian decoder are hidden states of a pedestrian, including a position hidden state, a velocity hidden state, an acceleration hidden state, and a class hidden state, obtained by a classifier. $h_i$ represents a hidden layer. A number of units of the hidden layers may be increased according to the capability of a computing platform. The hidden layer includes a weighting matrix coefficient and an activation function coefficient obtained by learning. An output of the convolutional neural network is a future trajectory of the pedestrian, including horizontal coordinates and vertical coordinates.

According to the method described above, the complex heterogeneous traffic environment dataset provided by Baidu Apollo is selected in the present embodiment for performance testing. The dataset is composed of 16.3 thousand pedestrians, 5.5 thousand bicycles, and 60.1 thousand vehicles. In the present embodiment, the present disclosure is compared with two well-known baseline models (recurrent neural network encoder-decoder (RNN-ED), social long short-term memory (LSTM)) and three hot models (social attention, traffic predict, directed graph convolutional neural network (VDRGCN)) in the art with respect to performance in the complex heterogeneous environment.

During training, numbers of time steps of an observed trajectory and a predicted trajectory are uniformly defined as 4 (2 s) and 6 (3 s). A batch size of each scene is set to 128. At generation 300, a stochastic gradient descent (SGD) training model optimizer is used to initialize a learning rate to 0.01. The learning rate is multiplied by 0.1 per 100 generations to accelerate the loss of convergence. In the present disclosure, an average error and an end error are used to represent the performance of the model and calculated by the following formulas:

$$ADE = \frac{\sum_{i=1}^{N} \sum_{t=1}^{P} \|\hat{u}_i^t - u_i^t\|}{N \times P}$$

where ADE represents the average error; $\hat{u}_i^t$ represents a predicated position of the ith traffic participant at time t; $u_i^t$ represents an actual position of the ith traffic participant at time t; N represents a number of traffic participants; and P represents a number of predicted steps.

$$FDE = \sum_{i=1}^{N} \|\hat{u}_i^P - u_i^P\| / N$$

where FDE represents the end error; $\hat{u}_i^P$ represents a predicated position of the ith traffic participant at the last step; and $u_i^P$ represents an actual position of the ith traffic participant at the last step.

Test results obtained in the present disclosure are as shown in FIG. 1. Numbers in the table represent the average errors/end errors. The smaller the error, the higher the prediction accuracy. It can be readily observed from the test results that the present disclosure performs excellently in the complex heterogeneous environment, and various indicators are ranked first. Compared with the second one, the average error and the end error of the present disclosure are reduced by 32% and 40%, respectively.

Table 1 Comparison Between Prediction Results of the Method of the Present Disclosure and the Prior Art

|   |   | Pedestrian | Bicycle | Vehicle | Average Performance Score |
|---|---|---|---|---|---|
| 1 | RNN-ED | 0.21/0.44 | 0.51/0.86 | 0.61/0.98 | 0.44/0.76 |
| 2 | Social LSTM | 0.23/0.30 | 0.65/0.84 | 0.50/0.77 | 0.54/0.71 |
| 3 | Social Attention | 0.19/0.28 | 0.74/1.01 | 0.54/0.95 | 0.41/0.66 |
| 4 | TrafficPredict | 0.16/0.26 | 0.38/0.63 | 0.40/0.66 | 0.31/0.52 |
| 5 | VDRGCN | 0.21/0.43 | 0.63/0.78 | 0.52/0.84 | 0.45/0.68 |
| 6 | The present disclosure | 0.08/0.10 | 0.26/0.38 | 0.30/0.45 | 0.21/0.31 |

In conclusion, the present disclosure performs excellently in the complex heterogeneous environment dataset. This indicates that the proposed solution has the capability of taking into account the dynamic characteristics of different traffic participants, different social attributes of different traffic participants, and a difference in processing environmental information between different traffic participants.

The foregoing is detailed description of the preferred specific embodiments of the present disclosure. It should be understood that a person of ordinary skill in the art can make various modifications and variations according to the concept of the present disclosure without creative efforts. Therefore, all technical solutions that a person skilled in the art can arrive at based on the prior art through logical analysis, reasoning, or finite experiments according to the concept of the present invention shall fall within the protection scope defined by the appended claims.

What is claimed is:

1. A method for predicting a trajectory of a traffic participant in a complex heterogeneous environment, comprising the following steps:
    obtaining traffic participant information in a complex heterogeneous environment, wherein the traffic participant information comprises position information, velocity information, acceleration information, and class information;
    arranging and numbering traffic participant classes based on the class information, to obtain serial numbers of the traffic participant classes;
    establishing, based on the traffic participant information, a position graph, a velocity graph, an acceleration graph, and a class graph, into each of which expert experience is introduced;
    capturing topological structure relationships and time dependence relationships from the position graph, the velocity graph, the acceleration graph, and the class graph based on four parallel spatial relationship capture networks and time dependence relationship capture networks, to obtain a position hidden state, a velocity hidden state, an acceleration hidden state, and a class hidden state;
    classifying the position hidden state, the velocity hidden state, the acceleration hidden state, and the class hidden state through determination by equations based on the serial numbers to obtain a hidden state set of traffic participants; and
    decoding hidden states of the traffic participants separately using a multi-mode decoder based on traffic participant classes to obtain future trajectory predictions of the traffic participants;

planning trajectory for an intelligent vehicle based on the future trajectory predictions of the traffic participants.

2. The method for predicting a trajectory of a traffic participant in a complex heterogeneous environment according to claim 1, wherein the traffic participant classes comprise pedestrian, bicycle, and vehicle.

3. The method for predicting a trajectory of a traffic participant in a complex heterogeneous environment according to claim 2, wherein the arranging and numbering traffic participant classes based on the class information, to obtain serial numbers of the traffic participant classes specifically comprise: arranging the class information as a class sequence in order, denoted by $[C^1, C^2 \ldots C^i \ldots C^N]$, wherein $C^i$ represents a class of the ith traffic participant; $C^i=1$ represents that the ith traffic participant is a pedestrian; $C^i=2$ represents that the ith traffic participant is a bicycle; $C^i=3$ represents that the ith traffic participant is a vehicle; N represents a number of traffic participants; and serial numbers corresponding to the class sequence are $[1, 2, \ldots i \ldots N]$.

4. The method for predicting a trajectory of a traffic participant in a complex heterogeneous environment according to claim 2, wherein the class graph into which the expert experience is introduced uses a traffic participant risk coefficient as a node and a risk degree as an edge, and an expert experience correction coefficient related to a transportation agent class is introduced into the edge, wherein the traffic participant risk coefficient depends on the traffic participant classes; and a relative distance between the risk degree and a traffic participant is related to an included angle of a velocity vector.

5. The method for predicting a trajectory of a traffic participant in a complex heterogeneous environment according to claim 4, wherein the expert experience correction coefficient related to the transportation agent class is:

$$OAE_C^{ij} = \begin{cases} 1 + \left|\frac{\vec{v}_i \cdot \vec{D}_{ji}}{\|\vec{v}_i\| \cdot \|\vec{D}_{ji}\|}\right|, & \left|\mathrm{acos}\left(\frac{\vec{v}_i \cdot \vec{D}_{ji}}{\|\vec{v}_i\| \cdot \|\vec{D}_{ji}\|}\right)\right| \leq \frac{\pi}{2} \\ 0, & \text{others} \end{cases}$$

wherein $OAE_c^{ij}$ represents the expert experience correction coefficient related to the transportation agent class; $\vec{v}_i$ represents a velocity vector of a traffic participant i; and $\vec{D}_{ji}$ represents a relative position vector between the traffic participant i and a traffic participant j.

6. The method for predicting a trajectory of a traffic participant in a complex heterogeneous environment according to claim 5, wherein the class graph is established by:

$$G_C = (U_C, E_C)$$

$$U_C = \{u_C^i = (C_c^i) | i = 1, 2, \ldots, N; c \in [1, 2, 3]\}$$

$$E_C = \left\{e_C^{ij} = OAE_C^{ij} \times \frac{1}{\|\vec{D}_{ji}\| + 1} | i, j = 1, 2, \ldots, N\right\}$$

wherein $G_c$ represents the class graph; $U_c$ is a node of the class graph, representing the traffic participant risk coefficient; $c \in [1,2,3]$ corresponds to a pedestrian, a bicycle, or a vehicle, respectively; $E_c$ is an edge of the class graph, representing the risk degree; and $\vec{v}_j$ represents the velocity vector of the traffic participant j.

7. The method for predicting a trajectory of a traffic participant in a complex heterogeneous environment according to claim 1, wherein the classifying the position hidden state, the velocity hidden state, the acceleration hidden state, and the class hidden state through determination by equations based on the serial numbers specifically comprises: performing matching on arranged features based on the serial numbers according to a position hidden state arrangement, a velocity hidden state arrangement, an acceleration hidden state arrangement, and a class hidden state arrangement output by the spatial relationship capture networks and the time dependence relationship capture networks, classifying features having a same serial number into a same class when the serial numbers in different arrangements are the same, namely when determination by equations is met, and obtaining a pedestrian hidden state set, a bicycle hidden state set, and a vehicle hidden state set based on serial number classes.

8. The method for predicting a trajectory of a traffic participant in a complex heterogeneous environment according to claim 1, wherein the spatial relationship capture network is a graph convolutional neural network.

9. The method for predicting a trajectory of a traffic participant in a complex heterogeneous environment according to claim 1, wherein the time dependence relationship capture network is a temporal convolutional network, a Long Short-Term Memory neural network, a recurrent neural network, or a gated neural network.

10. The method for predicting a trajectory of a traffic participant in a complex heterogeneous environment according to claim 1, wherein the multi-mode decoder is established by using a Long Short-Term Memory neural network, a convolutional neural network, a temporal convolutional network, a recurrent neural network, or a gated neural network.

* * * * *